(12) United States Patent
Vipulanandan

(10) Patent No.: US 10,690,586 B2
(45) Date of Patent: Jun. 23, 2020

(54) RAPID DETECTION AND QUANTIFICATION OF SURFACE AND BULK CORROSION AND EROSION IN METALS AND NON-METALLIC MATERIALS WITH INTEGRATED MONITORING SYSTEM

(71) Applicant: University of Houston System, Houston, TX (US)

(72) Inventor: Cumaraswamy Vipulanandan, The Woodlands, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 236 days.

(21) Appl. No.: 15/745,596

(22) PCT Filed: Jul. 18, 2016

(86) PCT No.: PCT/US2016/042766
§ 371 (c)(1),
(2) Date: Jan. 17, 2018

(87) PCT Pub. No.: WO2017/015199
PCT Pub. Date: Jan. 26, 2017

(65) Prior Publication Data
US 2018/0209893 A1    Jul. 26, 2018

Related U.S. Application Data

(60) Provisional application No. 62/195,233, filed on Jul. 21, 2015.

(51) Int. Cl.
*G01N 17/04*      (2006.01)
*G01N 17/02*      (2006.01)
(Continued)

(52) U.S. Cl.
CPC .......... *G01N 17/04* (2013.01); *G01N 17/02* (2013.01); *G01N 27/20* (2013.01); *G01N 27/24* (2013.01)

(58) Field of Classification Search
None
See application file for complete search history.

(56) References Cited

U.S. PATENT DOCUMENTS

| 5,180,969 A | 1/1993 | Kwun et al. |
| 5,966,011 A | 10/1999 | Goldfine et al. |

(Continued)

FOREIGN PATENT DOCUMENTS

| WO | 2008/051495 | 5/2008 |
| WO | 2015/061487 | 4/2015 |

OTHER PUBLICATIONS

Khokhar (Corrosion Rate Sensor Based on Electromagnetically Induced Current, Univeristi Teknologi Petornas, Tronoh, Perak, 2009) (Year: 2009).*

(Continued)

*Primary Examiner* — Roy Y Yi
(74) *Attorney, Agent, or Firm* — Jackson Walker LLP

(57) ABSTRACT

Systems and methods for real-time detecting and quantification of surface and bulk corrosion and erosion in materials involve measuring and characterizing the electrical resistances, capacitances, and/or inductances of the materials and their interfaces, preferably by using an impedance analyzer precision LCR meter. The materials may be metals, non-metals (such as plastics, polymers, cements, concrete, ceramics, rocks and soils) and composite materials with various types of material constituents (such as metals, plastics, polymers, and cements).

9 Claims, 3 Drawing Sheets

(51) Int. Cl.
      *G01N 27/20*      (2006.01)
      *G01N 27/24*      (2006.01)

(56) References Cited

U.S. PATENT DOCUMENTS 8,310,251 B2 *  11/2012  Orazem ................. C23F 13/04
                                                   324/713
9,020,099 B1     4/2015   Alzaidi

OTHER PUBLICATIONS

Agilent Basics of Measuring the Dielectric Properties of Materials 2006 (Year: 2006).*
Notification Concerning Transmittal of International Preliminary Report on Patentability and Written Opinion for International Application No. PCT/US2016/042766, International Bureau of WIPO, dated Feb. 1, 2018.

* cited by examiner

RAPID DETECTION AND QUANTIFICATION OF SURFACE AND BULK CORROSION AND EROSION IN METALS AND NON-METALLIC MATERIALS WITH INTEGRATED MONITORING SYSTEM This application claims priority to U.S. Provisional Patent Application Ser. No. 62/195,233, filed on Jul. 21, 2015, entitled "Rapid Detection and Quantification of Corrosion in Metals and Non-Metallic Materials with Integrated Monitoring System," the entire contents of which are hereby incorporated by reference.

BACKGROUND

The present invention relates to non-destructive direct measurement for detection and quantification of surface and bulk corrosion and erosion real-time in metals, non-metallic materials (such as plastics, polymers, cement, concrete, ceramics, rocks and soils) and composites in the field and laboratory.

Surface and bulk corrosion and erosion of metals and non-metallic materials is one of the oldest problems that has ever challenged the industrial world. The estimated losses due to these corrosion and erosion problems are in the billions of dollars per year in the U.S. alone. Surface and bulk corrosion and erosion are the gradual physiochemical-thermo-mechanical destruction of materials by the action of the environment and/or applied loading conditions. Corrosion or erosion of the material will result in degrading many other material properties. At present there is no real-time technology available to rapidly detect and quantify surface and bulk corrosion and erosion in a non-destructive way in situ from very small to very large areas of the material in the laboratory to the field.

One of the main needs that arises in the gas and oil industry during drilling and distributions of crucial energy sources is maintaining the longevity and reliability of drilling tools, casing connections and distribution pipelines. Also, in the civil infrastructures including foundations, piles, pipelines, buried structures, bridges, highways and buildings, there is urgent need for detecting the surface and bulk corrosion and erosion related deterioration of various structural and non-structural components for maintenance and extending the service life. Such objective is compromised mostly because of the presence of corrosion and erosion, both surface and bulk, which cannot be easily detected and quantified. Corrosion and erosion are naturally occurring phenomena commonly defined as the deterioration of a substance (usually a metal) or its properties because of a reaction with its environment. For the past two decades, there has been a tremendous amount of research focused on smart coatings for structural applications, such as coatings that can sense certain conditions and then respond. These are coatings that typically contain one or more indicators that can sense conditions such as corrosion and respond by means of changes in pH, color, fluorescence or a combination thereof (Harovel G. Wheat, 2012). In the industry of gas and oil, corrosion and erosion of steel casing in cement mortar, insulated pipelines and reinforced concrete is of concern because it requires almost immediate repairs and rehabilitation to extend the service life of the structures. Similarly in the area of civil infrastructures, surface and bulk corrosion and erosion in buried structures and above ground structures must be detected for rehabilitation to extend the service life of the facilities.

Some research has investigated using electrical resistance as a measure of corrosion and erosion protection provided by coatings. This research focused on the interaction of the metal-coating system with corrosive fluid environments such as NaCl solution and H2SO4 solution. The studies mainly focused on the change in the coating that arises from presence of corrosion and erosion products. Those studies did not address the changes in interface electrical properties. Other research studies have been focused on coatings that typically contain one or more indicators that can sense condition such as corrosion and respond by means of changes in pH, color, fluorescence or a combination thereof (Harovel G. Wheat, 2012). The applicability of such coatings for the steel casing in oil wellbores is difficult and impractical to monitor due to the changes that the coatings may exhibit as a result of the inaccessible nature of wellbore.

SUMMARY

The present disclosure relates generally to a system and method for detecting and quantifying the presence and amount of bulk and surface corrosion and erosion real-time, in both metallic and non-metallic materials (such as plastics, polymers, cement, concrete, ceramics, rocks and soils) and composites in the field and laboratory.

In this disclosure, critical monitoring property of the material (metals, non-metals and interfaces) has been identified. This is a nondestructive contact method of detecting the surface and bulk corrosion and erosion and the level of surface and bulk corrosion and erosion can be quantified real-time. The method can be used in the laboratory and in the field. The innovative contact method can be used on steel, other metals, plastics and interfaces. The method quantifies the surface and bulk corrosion and erosion based on bulk properties and contact properties. Experiments were performed on small (laboratory) samples and large (beams, columns, casings) samples to demonstrate the concept.

Generally, the system and method measure and characterize the electrical properties of the materials and interfaces being studied, in order to detect surface and bulk corrosion and erosion. For example, understanding the electrical properties at the interface level between steel and cement helps reveal the integrity of the interface condition. The presence of surface and bulk corrosion and erosion products is one of the problems that undermines the integrity of the interaction between steel and cement. In this disclosure, the electrical properties at interface level between oil well cement and corroded steel bar, and oil well cement are used to detect the presence of surface and bulk corrosion and erosion at the interface.

Advantages of the system and method include (1) its use as a measurement method, (2) rapid non-destructive contacts with or without an adapter, (3) quantification of surface and bulk corrosion and erosion and identification of the surface and bulk corrosion and erosion parameter, (4) applicability to metals, non-metals (including plastic) and interfaces (such as coating/metal), and (5) high sensitivity for small scale to large scale applications.

DETAILED DESCRIPTION OF PREFERRED EMBODIMENTS

The present disclosure relates to systems that will detect and quantify surface and bulk corrosion and erosion in real-time in metals and non-metals that are that are total or part of the load bearing or non-load bearing structures.

Figure 1:
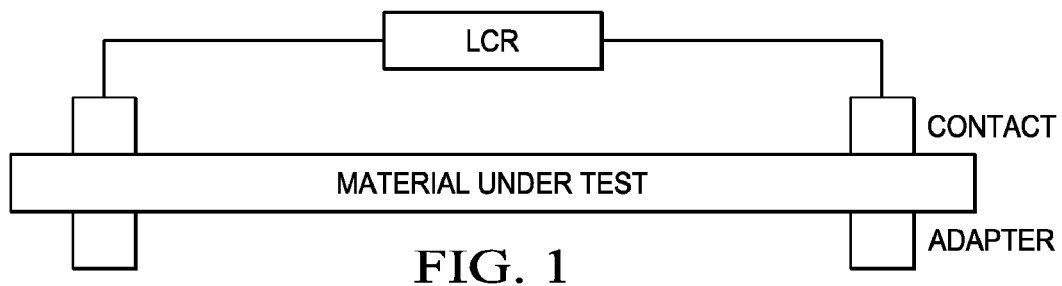
FIG. 1 shows a general schematic of a test for measuring surface and bulk corrosion and erosion using an impedance analyzer precision LCR meter.

In particular, the systems and methods involve measuring and characterizing the electrical resistance and capacitance (or inductance) of the materials and their interfaces, preferably by using an impedance analyzer precision LCR meter, which measures the inductance (L), capacitance (C) and resistance (R). FIG. 1 shows a general schematic of the test, in which the contacts may be magnets and the adapters, which are optional, may be steel or other metal attracted by the magnet on the opposite side of the material. The materials may be cement and steel, or any suitable materials, including plastics. The material may be a composite material also including a bulk material, which may be a coating, and a metal or non-metal reinforcement material. The contacts themselves are temporary and non-destructive and can be used in both the laboratory and in the field. The contacts or connections can be attached at various distances and on various sides of the material for measuring and collecting data on electrical resistance, capacitance, and inductance of the material. There is no limit to the spacing that can be used between the contacts, depending on the nature of the surface and bulk corrosion and erosion problem. The spacing can be from millimeters to kilometers. Changing the distance between the contacts allows for changing the measurements in various directions (by length, width, and thickness) and for obtaining useful information on the electrical properties of the material. The spacing between the connections can also help locate the actual point of corrosion or erosion.

Data is measured and collected on the electrical properties of the material. From this collected data, including bulk and surface electrical properties, impedance versus frequency of the material is calculated. Then, the calculated data is analyzed in order to determine the presence and amount of bulk and surface corrosion and erosion. A large amount of data is collected with varying frequency of measurement. The data can be processed real-time to determine the electrical properties and to detect surface and bulk corrosion and erosion point by point (with a spacing from millimeters to kilometers between connections) and to quantify the corrosion and erosion in three orthogonal directions from location to location.

EXAMPLE 1

Characterization

Cement specimens embedding two kinds of steel were prepared for laboratory tests to characterize the electrical properties of the interface between steel and cement. The size of the specimens was cylindrical with diameter of 2 inches and height of 4 inches. Corroded and non-corroded steel were used with the size of #3 and #4 respectively. Both steel types had a length of 5 inches. Specimens were instrumented with 5 silver-painted wires connected to the embedded steel and 2 silver-painted wires connected to the cement (illustrated in FIG. 2). The electrical resistances and capacitance of the cement, steel, and transitional contact between the cement and steel were measured with impedance analyzer precision LCR meter.

Figure 2:
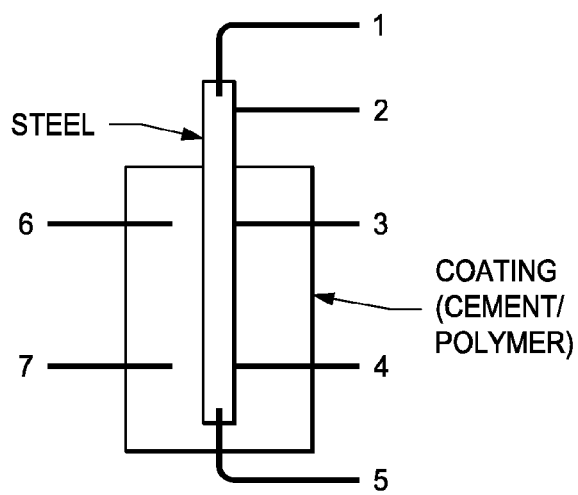
FIG. 2 shows a diagram of wires imbedded on a sample in order to examine the electrical properties of the sample at various locations.
Figure 3:
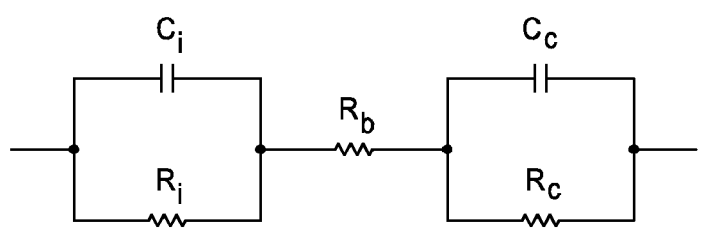
FIG. 3 shows an equivalent circuit adopted based on expected behavior of the material being studied.

The expected behavior of the material being studied was used to create a model equivalent circuit shown in FIG. 3. The total impedance Z of the equivalent circuit is given as follows, for a particular example of impedance between contact 1 and contact 7 shown in FIG. 2 (Vipulanandan et al. 2013):

$$Z = R_b + \frac{R_c}{1+\omega^2 R_c^2 C_c^2} + \frac{R_i}{1+\omega^2 R_i^2 C_i^2} - j\left(\frac{\omega R_c^2 C_c}{1+\omega^2 R_c^2 C_c^2} + \frac{\omega R_i^2 C_i}{1+\omega^2 R_i^2 C_i^2}\right)$$

In the equation, $\omega$ is the angular frequency of the applied signal. $R_b$ is the resistance of the bulk material cement. $R_c$ and $C_c$ are the resistance and capacitance of the contacts on the metal. $R_i$ and $C_i$ are the resistance and capacitance of the contacts on the interface between concrete and metal.

Figure 4:
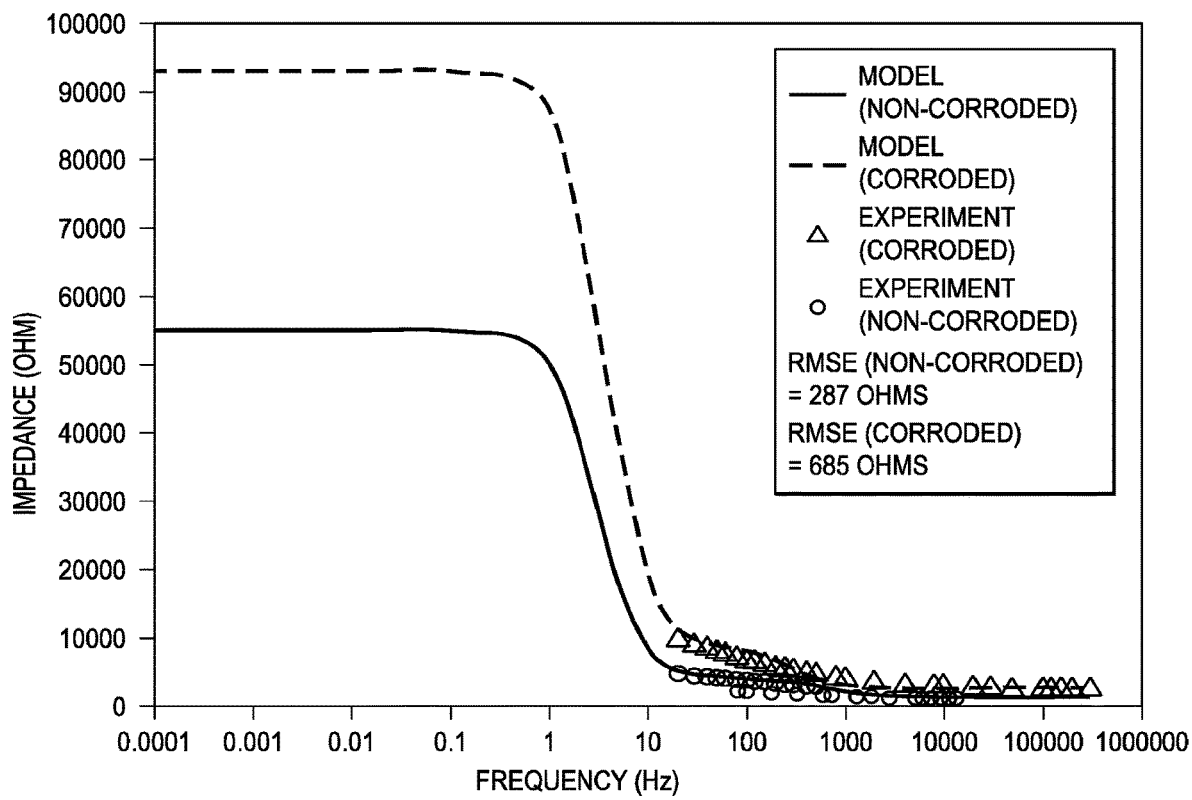
FIG. 4 shows a bode plot of real impedance vs. frequency for models and for experimental samples.

The applied signal was carried out with frequency range of 20 Hz to 300 kHz. A bode plot of the real impedance versus frequency is shown in FIG. 4. From the bode plot, it can be seen that the difference in electrical resistance of corroded and non-corroded specimens was captured experimentally, particularly that of the interface between the steel and cement, where corrosion and erosion products are present. The experimental data was consistent with the model for both corroded and non-corroded specimens. The results demonstrate that characterization of electrical properties between steel and cement can be accomplished and can be used to characterize the presence of surface and bulk corrosion and erosion between steel and cement. This electrical and relatively simple test method could be used effectively in determining the presence of corrosion and erosion at the steel-cement interface of any materials.

With reference to FIGS. 1 and 2, the contacts in FIG. 1 can be placed at points 1 and 2 of the schematic of FIG. 2 (without any adapters) to measure the surface and bulk corrosion and erosion in the steel. To get the interface corrosion, represented by $R_i C_i$ measurements will be done between point 1 and wire 6, point 1 and wire 7, point 2 and wire 6, point 2 and wire 7. The results will be used to determine $R_i$ and $C_i$. If the wire (at 6 & 7) is not available, an alternative is to place a metallic horse clamp around the specimen and then place the magnet on the metallic tape. This will give a new contact. $R_c$ and $C_c$ will not affect the $R_i$ and $C_i$.

As shown in FIG. 4, during the testing a number of data will be collected. The maximum unknowns in the impedance (Z) versus (w) relationship above are 5 ($R_b$, $R_c$, $C_c$, $R_i$ and $C_i$). So from the data collected (over 20 sets) it will be possible to determine these parameters using optimization.

There are 5 unknowns and 20 equations. Measurements could be 100 sets instead of 20 sets, which is part of the advantage of this method.

For non-corroded steel, $R_b$ (which represents the corrosion inside the steel-bulk) will be less than 1 KΩ based on the size of the steel element being tested. If the L (shown in FIG. 8) is in a few millimeters then the $R_b$ will be in milli-ohms. The surface corrosion will be represented by $R_c$ and $C_c$. If no corrosion, $R_c C_c$ (a new parameter) will be less than $10^{-6}$ ohm-Farad (ΩF). Also, $R_c$ and $C_c$ will be very small.

If there is corrosion, $R_b$ will be of the order of KOhm to GOhm. $R_c C_c$ will be $10^{-2}$ ΩF or higher based on the material being tested.

EXAMPLE 2

Evaluation of Equivalent Circuits

Identification of the most appropriate equivalent circuit to represent the electrical properties of a material surface and bulk corrosion and erosion is essential to further understand its properties. In this study, an equivalent circuit to represent the corroded material and corroded interfaces was required for better characterization through the analyses of the impedance spectrascopy data. It was necessary to make a link between the different elements in the circuit and the different regions in the impedance data of the corresponding sample. Given the difficulties and uncertainties, researchers tend to use a pragmatic approach and adopt a circuit which they believe to be most appropriate from their knowledge of the expected behavior of the material under study, and demonstrate that the results are consistent with the circuit used. In this example, different possible equivalent circuits were analyzed to find an appropriate equivalent circuit to represent the material and interface.

In a first case (Case 1), the resistance and capacitance of a general bulk material was considered. In the equivalent circuit for Case 1, the contacts were connected in series, and both the contacts and the bulk material were represented using a capacitor and a resistor connected in parallel (based on the connections previously shown in FIG. 1).

Figure 5:
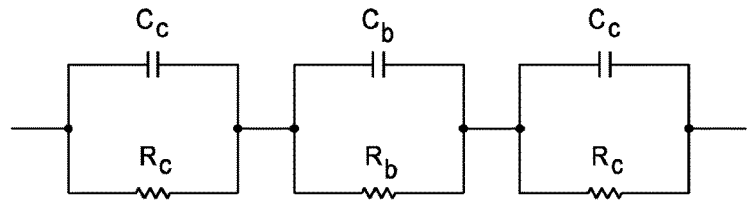
FIG. 5 shows an equivalent circuit adopted based on alternate expected behavior of the material being studied (Case 1).
Figure 7:
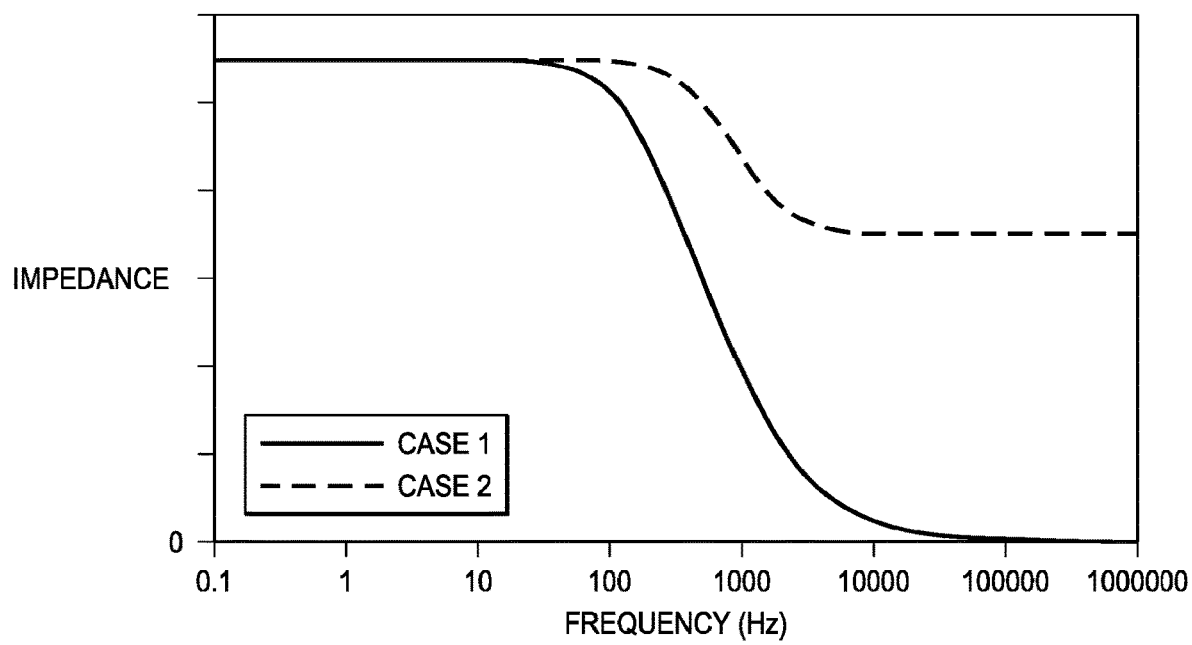
FIG. 7 shows a comparison of typical responses of impedance vs. frequency of different equivalent circuits.

In the equivalent circuit for Case 1, shown in FIG. 5, $R_b$ and $C_b$ are resistance and capacitance of the bulk material (i.e. inside the material), respectively, and $R_c$ and $C_c$ are resistance and capacitance of the contacts surface or interface, respectively, representing the surface condition of the material. The magnitudes can vary based on the type of metal, non-metal, and plastic materials being tested. Both contacts are represented with the same resistance ($R_c$) and capacitance ($C_c$) as they are identical. Total impedance of the equivalent circuit for Case 1 ($Z_1$) can be represented as follows (Vipulanandan et al. 2013):

$$Z_1 = \frac{R_b}{1+\omega^2 R_b^2 C_b^2} + \frac{2R_c}{1+\omega^2 R_c^2 C_c^2} - j\left(\frac{2\omega R_c^2 C_c}{1+\omega^2 R_c^2 C_c^2} + \frac{\omega R_b^2 C_b}{1+\omega^2 R_b^2 C_b^2}\right),$$

$$Z_1 = R - jX$$

where ω is the angular frequency of the applied signal. When the frequency of the applied signal was very low, ω→0, $Z_1=R_b+2R_c$, and when it is very high, ω→∞, $Z_1=0$ (FIG. 7).

If X (Eqn. $Z_1=R-jX$) is negative the circuit has capacitance. If the X is positive (non-corroded cases) then inductance will represent the circuit replacing the capacitance.

Figure 6:
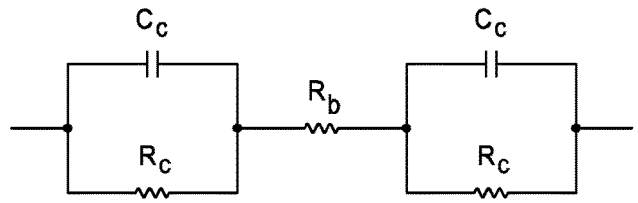
FIG. 6 shows an equivalent circuit adopted based on alternate expected behavior of the material being studied (Case 2).

In a second case (Case 2), which is a special case of Case 1, the capacitance of the bulk material ($C_b$) was assumed to be negligible. The equivalent circuit is shown in FIG. 6. The total impedance of the equivalent circuit for Case 2 ($Z_2$) is as follows (Vipulanandan et al. 2013):

$$Z_2 = R_b \ldots + \frac{2R_c \ldots}{1+\omega^2 R_c^2 C_c^2} - j\frac{2\omega R_c^2 C_c \ldots}{1+\omega^2 R_c^2 C_c^2}$$

When the frequency of the applied signal was very low, ω→0, $Z_2=R_b+2R_c$, and when it is very high, ω→∞, $Z_2=R_b$ (FIG. 7).

FIG. 7 shows a comparison of typical responses for the equivalent circuits for Case 1 and Case 2. Testing for surface and bulk corrosion and erosion (material or interface) indicated that Case 2 represented the behavior in the frequency range of 20 Hz to 300 kHz. at a frequency of 300 kHz.

Figure 8:
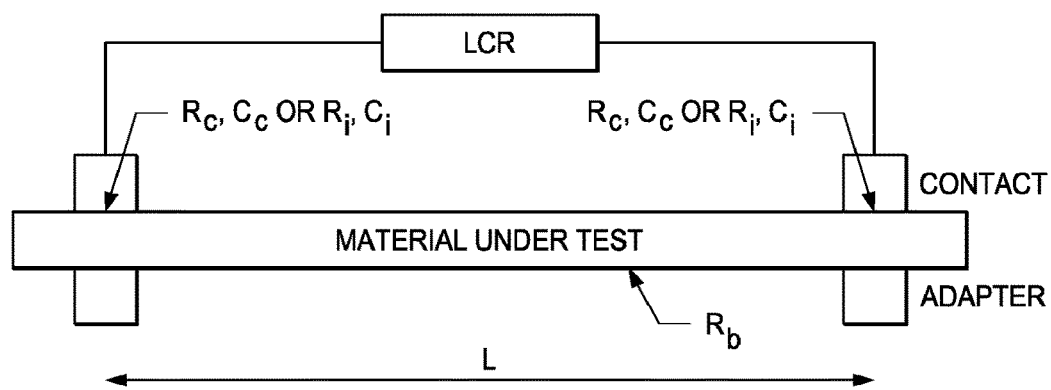
FIG. 8 shows a general schematic of a test for measuring surface and bulk corrosion and erosion of a specimen using an impedance analyzer precision LCR meter with various quantifying electrical parameters.

FIG. 8 shows an additional schematic of the test, in which $R_b$ represents the bulk material with a corroded specimen. If no corrosion or erosion the resistance for metals will be in milli-Ohms. Based on the degree of corrosion and erosion it will be in kOhms or Megaohms. $C_b$ is very high for plastic materials. The $R_b$ could be very low (Phase angle −90°). $R_c$ represents the contact resistance for the magnet. It will represent the surface conditions. If there is surface or bulk corrosion or erosion then $R_c$ will be much higher. $R_c C_c$ or $R_i C_i$ is the interface surface or bulk corrosion and erosion. This is a new quantification representing the interface (contact) condition. It will increase with the degree of corrosion and erosion, and magnitudes can vary based on the material interfaces being tested. The spacing distance between contacts (L) can be in millimeters to meters and more. $R_b$ and $R_i C_i$ can be determined in different directions and different thickness of the material to provide information about the surface and bulk corrosion and erosion direction. Based on the type of material and the corrosion or erosion, capacitance (C) can be substituted or replaced with inductance.

REFERENCES

Harovel G. Wheat, Smart Coatings for Corrosion Detection-A Review of Recent Advances, ISOPE, 2012.

Vipulanandan, C. and Prashanth, P., "Impedance Spectroscopy Characterization of a Piezoresistive Structural Polymer Composite Bulk Sensor," Journal of Testing and Evaluation, Vol. 41, No. 6, 2013, pp. 898-904.

Corrosion Costs and Preventive Strategies in the United States, NACE International

What is claimed is:

1. A method for detecting and quantifying the presence and amount of corrosion and erosion on the surface and bulk of a material along the three dimensional length, thickness and width of the material, comprising:

attaching temporary and non-destructive contacts to the material for measuring and collecting data at various locations on the material and with various distances between the contacts, wherein the distances between the contacts range from millimeters to kilometers;

measuring and collecting data to calculate impedance versus frequency response of the material at a frequency range of 20 Hz to 300 kHz; and analyzing the impedance frequency response to determine the presence and amount of surface and bulk corrosion and erosion of the material.

2. The method of claim 1, wherein the material is metallic, non-metallic, or a composite material.

3. The method of claim 1, wherein the material is a composite material comprising a bulk material, wherein the bulk material is non-metallic or metallic, and a reinforcement material, wherein the reinforcement material is non-metallic or metallic, and wherein the contacts touch the bulk material and the reinforcement material at two points.

4. The method of claim 3, wherein the bulk material is cement, concrete, or plastic and the reinforcement material is steel, aluminum, or polymers.

5. The method of claim 3, further comprising the step of calculating a model of impedance versus frequency using an equivalent circuit equation and comparing the model of impedance versus frequency to the impedance experimental data.

6. The method of claim 5, wherein the equivalent circuit equation is (FIG. 3):

$$Z = R_b + \frac{R_c}{1+\omega^2 R_c^2 C_c^2} + \frac{R_i}{1+\omega^2 R_i^2 C_i^2} - j\left(\frac{\omega R_c^2 C_c}{1+\omega^2 R_c^2 C_c^2} + \frac{\omega R_i^2 C_i}{1+\omega^2 R_i^2 C_i^2}\right),$$

wherein Z is impedance, $\omega$ is angular frequency, $R_b$ is resistance of the bulk material, $R_c$ and $C_c$ are resistance and capacitance of a contact on the reinforcement material, and $R_i$ and $C_i$ are resistance and capacitance of a contact on the interface between the bulk material and the reinforcement material.

7. The method of claim 5, wherein the equivalent circuit equation is (FIG. 5):

$$Z_1 = \frac{R_b}{1+\omega^2 R_b^2 C_b^2} + \frac{2R_c}{1+\omega^2 R_c^2 C_c^2} - j\left\{\frac{2\omega R_c^2 C_c}{1+\omega^2 R_c^2 C_c^2} + \frac{\omega R_b^2 C_b}{1+\omega^2 R_b^2 C_b^2}\right\},$$

wherein Z is impedance, $\omega$ is angular frequency, $R_b$ and $C_b$ are resistance and capacitance of the bulk material, and $R_c$ and $C_c$ are resistance and capacitance of contacts on a surface of the bulk material.

8. The method of claim 5, wherein the equivalent circuit equation is (FIG. 6):

$$Z_2 = R_b + \frac{2R_c}{1+\omega^2 R_c^2 C_c^2} - j\frac{2\omega R_c^2 C_c}{1+\omega^2 R_c^2 C_c^2},$$

wherein Z is impedance, $\omega$ is angular frequency, $R_b$ is resistance of the bulk material, and $R_c$ and $C_c$ are resistance and capacitance of contacts on a surface of the reinforcement material.

9. The method of claim 5, wherein the step of attaching temporary and non-destructive contacts to the material comprises touching the surface of the material with two probes at various locations along the length, width and thickness of the material to calculate the impedance frequency response of the material between the various locations in different directions and surfaces.

* * * * *

UNITED STATES PATENT AND TRADEMARK OFFICE
CERTIFICATE OF CORRECTION

PATENT NO. : 10,690,586 B2
APPLICATION NO. : 15/745596
DATED : June 23, 2020
INVENTOR(S) : Cumaraswamy Vipulanandan Page 1 of 1

It is certified that error appears in the above-identified patent and that said Letters Patent is hereby corrected as shown below:

In the Specification
1. In Column 2, Line 5, delete "H2504" and insert -- H2SO4 --, therefor.
2. In Column 4, Line 55, delete "RiCi" and insert -- RiCi, --, therefor.
3. In Column 4, Line 65, delete "(w)" and insert -- (ω) --, therefor.
4. In Column 5, Lines 56-58, delete the ")" at the end of the formula and insert a -- } -- at the end of the formula, therefor.

In the Claims
5. In Column 6, Lines 63-64, in Claim 1, delete "to calculate impedance versus frequency response of the material at a frequency range of 20 Hz to 300 kHz; and" and insert the same at Line 62, after "collecting data", as a continuation point.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*